(12) United States Patent
Kahwaji et al.

(10) Patent No.: US 10,901,669 B2
(45) Date of Patent: Jan. 26, 2021

(54) MECHANISM TO PREDICT PRINT PERFORMANCE USING PRINT METADATA

(71) Applicants: Omar Ghalib Kahwaji, Fort Collins, CO (US); Ryan Blake Jackson, Golden, CO (US)

(72) Inventors: Omar Ghalib Kahwaji, Fort Collins, CO (US); Ryan Blake Jackson, Golden, CO (US)

(73) Assignee: Ricoh Company, Ltd., Tokyo (JP)

( * ) Notice: Subject to any disclaimer, the term of this patent is extended or adjusted under 35 U.S.C. 154(b) by 322 days.

(21) Appl. No.: 15/806,594

(22) Filed: Nov. 8, 2017

(65) Prior Publication Data

US 2019/0138256 A1   May 9, 2019

(51) Int. Cl.
*G06F 3/12* (2006.01)
*G06N 20/00* (2019.01)
*H04N 1/00* (2006.01)
*G06Q 10/04* (2012.01)
*G06Q 30/02* (2012.01)

(52) U.S. Cl.
CPC .......... *G06F 3/1256* (2013.01); *G06F 3/1211* (2013.01); *G06F 3/1229* (2013.01); *G06F 3/1255* (2013.01); *G06F 3/1273* (2013.01); *G06F 3/1282* (2013.01); *G06F 3/1285* (2013.01); *G06N 20/00* (2019.01); *G06Q 10/04* (2013.01); *H04N 1/00029* (2013.01); *G06F 3/126* (2013.01); *G06F 3/1232* (2013.01); *G06Q 30/0201* (2013.01); *G06Q 30/0282* (2013.01)

(58) Field of Classification Search
CPC .... G06F 3/1256; G06F 3/1211; G06F 3/1229; G06F 3/1255; G06F 3/1273; G06F 3/1282; G06F 3/1285; G06F 3/1232; G06F 3/126; G06N 20/00; G06Q 10/04; G06Q 30/0201; G06Q 30/0282; H04N 1/00029
USPC .......................................................... 703/21
See application file for complete search history.

(56) References Cited

U.S. PATENT DOCUMENTS 6,266,693 B1 * 7/2001 Onaga .................. G06F 3/1204
358/1.1
7,602,514 B2   10/2009 Levin et al.
(Continued)

FOREIGN PATENT DOCUMENTS

CN       1929530 A       3/2007
JP      2000353057 A     12/2000
(Continued)

OTHER PUBLICATIONS

European Search Report for EP18204280.4, dated Feb. 12, 2019, 9 pages.
(Continued)

*Primary Examiner* — Justin C Mikowski
(74) *Attorney, Agent, or Firm* — Jaffery Watson Mendonsa & Hamilton LLP

(57) ABSTRACT

A printing system is described. The printing system includes a memory to store print performance prediction logic and a processor to execute the print performance prediction logic to train a prediction model, receive print job metadata, receive configuration criteria of a printing system and predict first processing performance measurements of the printing system using the prediction model to simulate the printing system based on the print job metadata and the configuration criteria.

12 Claims, 4 Drawing Sheets

(56) References Cited

U.S. PATENT DOCUMENTS

| | | | |
|---|---|---|---|
| 8,330,972 B2 | 12/2012 | Morales et al. | |
| 8,441,668 B2 | 5/2013 | Shrader et al. | |
| 8,547,580 B2 | 10/2013 | Wang et al. | |
| 8,786,888 B2 | 7/2014 | Giannetti et al. | |
| 9,377,970 B1* | 6/2016 | Pan | G06F 3/1203 |
| 9,696,947 B1 | 7/2017 | Gil | |
| 2001/0043358 A1* | 11/2001 | Schwartz | G06K 15/02 |
| | | | 358/1.15 |
| 2004/0190033 A1* | 9/2004 | Ferlitsch | G06F 3/1204 |
| | | | 358/1.13 |
| 2004/0218201 A1* | 11/2004 | Lermant | G06F 3/1205 |
| | | | 358/1.13 |
| 2007/0070379 A1* | 3/2007 | Rai | G06Q 10/06 |
| | | | 358/1.13 |
| 2007/0165258 A1* | 7/2007 | Farrell | G06F 3/1205 |
| | | | 358/1.13 |
| 2009/0303502 A1* | 12/2009 | Robinson | G06Q 10/06315 |
| | | | 358/1.9 |
| 2012/0062933 A1 | 3/2012 | Zeng et al. | |
| 2013/0278964 A1* | 10/2013 | Zeng | G06F 3/1207 |
| | | | 358/1.15 |
| 2014/0178084 A1 | 6/2014 | Kuo et al. | |
| 2014/0180651 A1 | 6/2014 | Lysak et al. | |
| 2014/0297234 A1* | 10/2014 | Garzon | G06F 11/00 |
| | | | 703/2 |
| 2014/0355043 A1* | 12/2014 | Zeng | G06F 3/1259 |
| | | | 358/1.15 |
| 2016/0216923 A1* | 7/2016 | Willamowski | G06F 3/1219 |
| 2017/0054859 A1* | 2/2017 | Zehler | H04N 1/00244 |

FOREIGN PATENT DOCUMENTS

| | | |
|---|---|---|
| JP | 2001071602 A | 3/2001 |
| JP | 2010225136 A | 10/2010 |
| JP | 2010244277 A | 10/2010 |

OTHER PUBLICATIONS

Japanese Office Action from JP Application No. 2018208530, dated Oct. 8, 2019, 4 pages.

Japanese Office Action from JP Application No. 2018208530, dated Feb. 12, 2020, 5 pages.

* cited by examiner

MECHANISM TO PREDICT PRINT PERFORMANCE USING PRINT METADATA

FIELD

This invention relates generally to the field of printing systems. More particularly, the invention relates to model performance of printing systems.

BACKGROUND

Entities with substantial printing demands typically implement a high-speed production printer for volume printing (e.g., one hundred pages per minute or more). Production printers may include continuous-forms printers that print on a web of print media stored on a large roll. A production printer typically includes a localized print controller that controls the overall operation of the printing system, and a print engine that includes one or more printhead assemblies, where each assembly includes a printhead controller and a printhead (or array of printheads).

High-performance production printers represent a significant monetary investment. Thus potential customers want to ensure that a printer will perform well on specific set of documents prior to finalizing a purchase. Printer salespeople are also often interested in sizing a purchase forecast via performance metrics means. Specifically, a salesperson is typically interested in determining a minimum hardware configuration required to achieve a customer's desired performance. Such a determination may require testing a document on an actual printer or control unit, which may take a prohibitively long time due to limited hardware resources, man power available for testing. For instance, a trained individual may need up to three days to produce a full printer performance report.

A second problem arises due to failure to communicate required printer configuration adequately between current or prospective customers and various teams across an organization. This problem may lead to testing the documents with the wrong printer configurations, which subsequently leads to producing incorrect performance measurements and/or hardware recommendations to customers.

Another issue is generated by legal and bureaucratic requirements to obtain customer documents. Thus, requests from prospective customers could queue for up to several months before receiving results. This high turnaround times may result in customer frustration and dissatisfaction. A possible solution to this problem would be to acquire more hardware resources to aid in reducing turnaround times. However, such technology makes this solution economically unappealing, if not infeasible, due to the price tag required to purchase extra hardware and the need to have domain specific knowledge in order to obtain performance metrics measurements.

Accordingly, a mechanism to efficiently determine print performance of a high-speed printer is desired.

SUMMARY

In one embodiment, a method is disclosed. The method includes training a prediction model, receiving print job metadata, receiving configuration criteria of a printing system and predicting first processing performance measurements of the printing system using the prediction model to simulate the printing system based on the print job metadata and the configuration criteria.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

A mechanism to predict print performance of a high-speed printer is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed from printing system 100 to facilitate various embodiments including adding, removing, and/or enhancing certain features. For brevity, clarity, and ease of understanding of printing system 100, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 1:
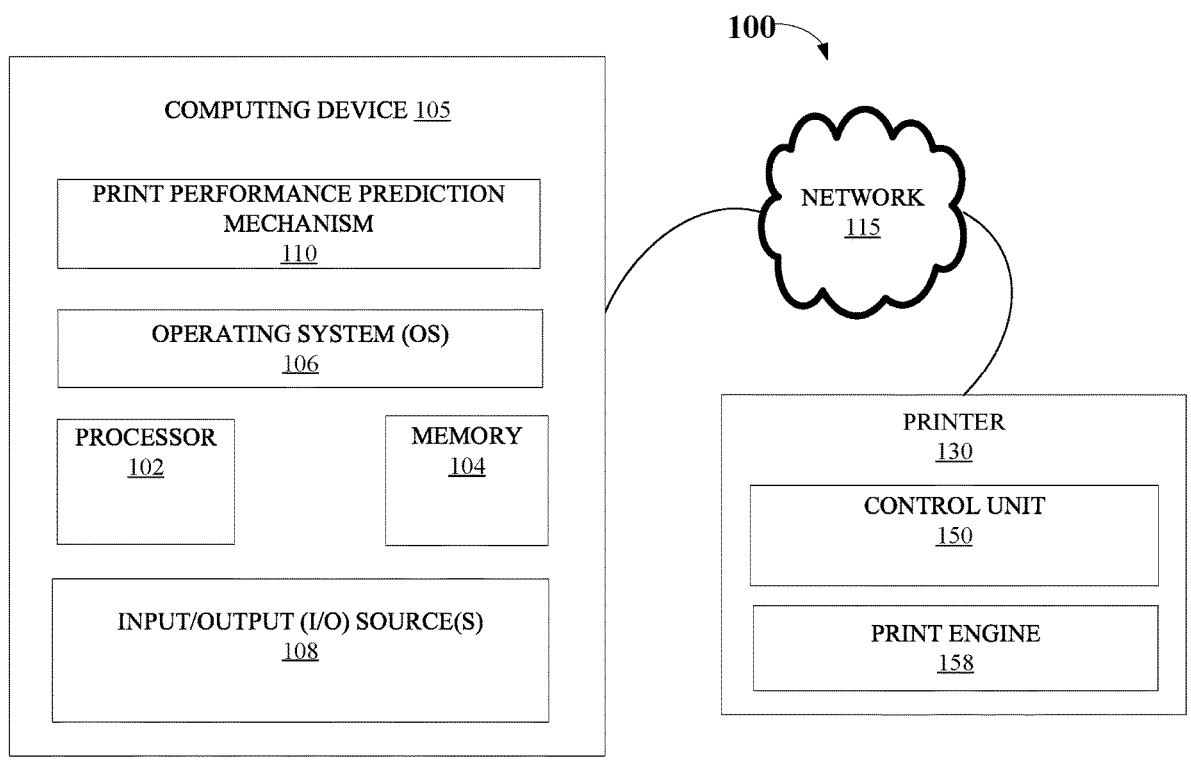
FIG. 1 illustrates one embodiment of a printing system.

FIG. 1 illustrates one embodiment of a printing system 100. Printing system 100 includes a printer 130 and a computing device 105. In one embodiment, printer 130 and computing device 105 communicate via a network 115. However, printing system may have other configurations. For example, in some embodiments computing device 105 may be implemented in printer 130.

According to one embodiment, computing device 105 serves as a host machine for hosting print performance prediction mechanism 110 that includes a combination of any number and type of components for facilitating print performance prediction at computing devices, such as computing device 105.

Computing device 105 may include an operating system (OS) 106 serving as an interface between hardware and/or physical resources of the computer device 100 and a user. Computing device 105 may further include one or more processors 102, memory devices 104, network devices, drivers, or the like, as well as input/output (I/O) sources 108, such as touchscreens, touch panels, touch pads, virtual or regular keyboards, virtual or regular mice, etc.

According to one embodiment, performance prediction mechanism 110 enables the acquisition of printer performance measurements. In such an embodiment, prediction mechanism 110 implements one or more supervised machine learning models to estimate processing performance metrics for printing documents without having to print the documents at printer 130. In a further embodiment, raw document information (e.g., metadata) is extracted from print job data and used as input to the model. In this embodiment, the metadata is extracted via a specialized software tool. In other embodiments, print job data may instead be used as input to the model.

Printer 130 includes a control unit 150 and a print engine 158. According to one embodiment, control unit 150 processes and renders objects received in print job data 120 and provides sheet maps for printing to print engine 158. Control unit (e.g., DFE or digital front end) 150 is implemented to process image objects received at control unit 150 by a raster image processor (RIP) to convert an image described in a vector graphics format (e.g., shapes) into a raster image (e.g., pixels) that is to be stored as scan line data in a memory array (not shown) for output to print engine 158.

Figure 2:
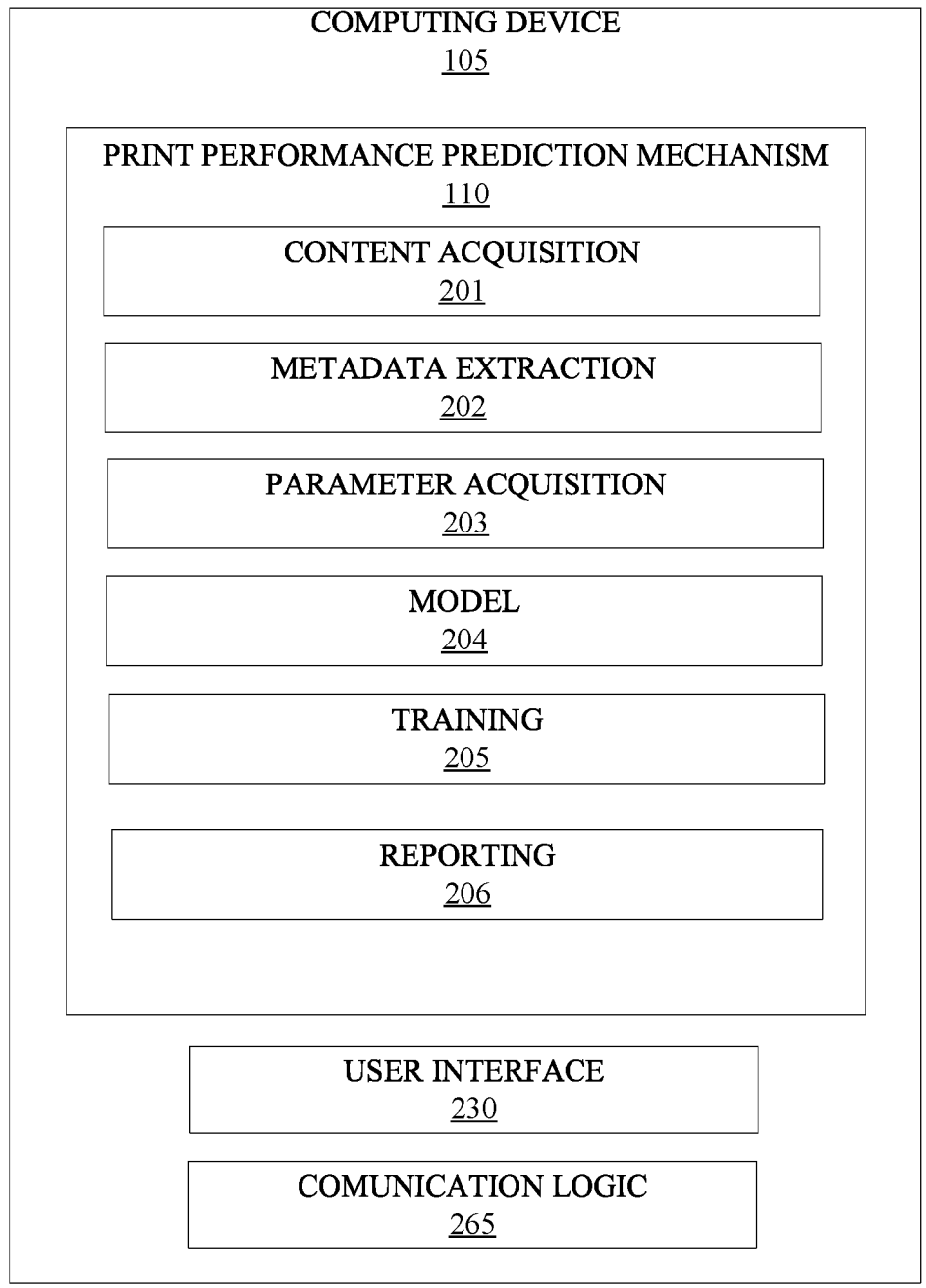
FIG. 2 illustrates one embodiment of a computing device employing a print performance prediction mechanism.

FIG. 2 illustrates a print performance prediction mechanism 110 employed at computing device 100. In one embodiment, print performance prediction mechanism 110 may include any number and type of components, such as: content acquisition module 201, metadata extraction logic 202, parameter acquisition module 203, prediction model 204, training module 205 and reporting module 206. It is contemplated that any number and type of components 201-206 of print performance prediction mechanism 110 may not necessarily be at a single computing device and may be allocated among or distributed between any number and type of computing devices. Thus, another computing device may also include print performance prediction mechanism 110 to perform functionality for one or more of components 201-206.

According to one embodiment, content acquisition module 201 receives print data (e.g., one or more print jobs and corresponding job tickets, if available) as input data. Upon receipt, metadata extraction logic 202 extracts metadata from the print data. In one embodiment, the metadata includes core components of the print data. For instance, metadata for a book to be printed may include information regarding a number of fonts, type of fonts, font sizes and colors, effects performance, etc. In a further embodiment, the metadata may be included in an Extensible Markup Language (XML) file.

Parameter acquisition module 203 receives printer configuration information. In one embodiment, printer configuration information includes information (or criteria) regarding a printer architecture, such as operational memory and/or processor type (e.g., number of cores, processor architecture, speed or quantity), printer settings (e.g., print quality, print resolution, page handling, etc.), as well as performance model. In a further embodiment, printer configuration information may be provided as a set of available configurations (e.g., a plurality of printer configurations). In such an embodiment, a determination may be made as to which of the printer configurations meet requirements.

In one embodiment, a performance model may include information necessary to generate a job corresponding to the received print data (e.g., print speed, page resolution, page rotation, and front/back or one-sided printing). Additionally, parameter acquisition module 203 receives one or more attributes required to satisfy system performance (or printing system performance requirements), which may include print speed, rasterization time, render time, cost factors, etc. In a further embodiment, the printer configuration information is received via a graphical user interface tool, such as user interface 230.

According to one embodiment, prediction model 204 determines a processing performance of printing system 130 based on the metadata (or the print job) and the printer configuration information. In this embodiment, prediction model 204 generates processing performance measurements for new documents and/or printer configurations in order to simulate the printing system without having to print documents corresponding to the print data. For example, processing performance measurements may include attributes, such as printing speed, raster image processing time, printing rated speed, document interpretation time and a number of processing resources necessary for optimal performance, etc.

In a further embodiment, the processing performance measurements may be implemented to determine whether the printing system performance satisfies the performance requirements acquired at parameter acquisition module 203. Further, model 204 may determine printing system configurations and/or models that satisfy the performance requirements. Moreover, model 204 may select a best fit printing system configuration and/or model based on the performance measurements using a weighting algorithm for performance requirements In this embodiment, model 204 may determine one or more of a plurality of received printer configurations that meet the performance requirements.

According to one embodiment, model 204 implements a machine learning predictive model to simulate the processing performance of printer 130. In such an embodiment, model 204 uses print data and corresponding processing performance measurements for jobs that have been previously printed at printer 130 to generate current processing performance measurements.

In a further embodiment, training module 205 is implemented to train model 204 prior to implementation of prediction mechanism 110 using training data that comprises the previously processed print data and corresponding processing performance measurements from printer 130. In yet a further embodiment, training module 205 may periodically be used to re-train model 204 with updated training data. Accordingly, the prediction accuracy of model 204 is increased due to an increase in sample size. Additionally, re-training model 204 enables the model to accommodate future technologies and products.

Reporting module 206 generates a presentation report that includes the performance measurements, as well as any additional information that is desirable to include in the presentation (e.g. printer configurations, performance requirements, and/or print jobs evaluated). Computing device 105 may also include communication logic 265 to facilitate communication with control unit 150 at printer 130 over network 115. In one embodiment, reporting module 206 transmits the presentation report to printer 130 to generate a hard copy of the report. In another embodiment, training module 205 receives the training data from printer 130 via communication logic to use for the training of prediction model 204. In yet another embodiment, computing device 105 may release the evaluated print jobs to the printer 130 upon a determination that the configuration of printer 130 achieves the performance requirements.

Figure 3:
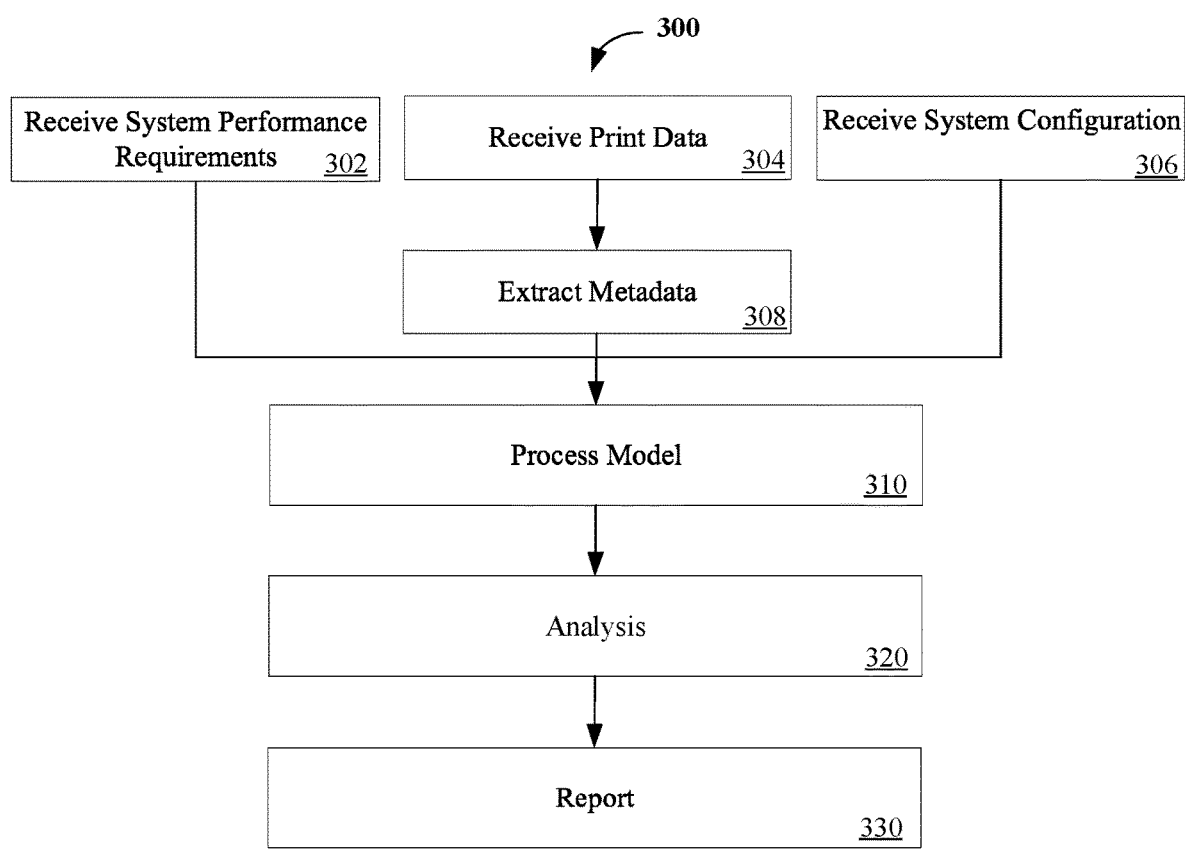
FIG. 3 is a flow diagram illustrating one embodiment of a process to performed to predict print performance of a high-speed production printer.

FIG. 3 is a flow diagram illustrating one embodiment of a process 300 performed to predict performance of a printing system. Process 300 may be performed by processing logic that may comprise hardware (e.g., circuitry, dedicated logic, programmable logic, etc.), software (such as instructions run on a processing device), or a combination thereof. In one embodiment, process 300 may be performed by print performance prediction mechanism 110. The process 300 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1&2 are not discussed or repeated here.

According to one embodiment, a prediction model is trained in a manner discussed above prior to the implementation of process 300. Once trained, system performance requirements, print data and system configuration information/criteria are received, processing blocks 302, 304 and 306, respectively. At processing block 308, the metadata is extracted from the print data prior to be provided to the prediction model. At processing block 310, the prediction model is processed based on the received data to generate the processing performance measurements.

At processing block 320, the processing performance measurements generated by the model are analyzed with reference to the system performance requirements. For instance, the model analysis may determine whether the printing system performance satisfies the received performance requirements acquired at parameter acquisition module 203, as well as printing system configurations and/or models that satisfy the performance requirements. Additionally, the model analysis may select a best fit printing system configuration and/or model based on the performance measurements. At processing block 330, a report including the processing performance measurements and analysis may be generated and provided via a desired format.

The above-described prediction mechanism eliminates having to test documents on an actual printer or control unit to determine if a printer satisfies performance requirements. Additionally, the mechanism dispenses with a requirement of a trained individual with domain specific knowledge to execute and obtain performance metrics measurements.

Figure 4:
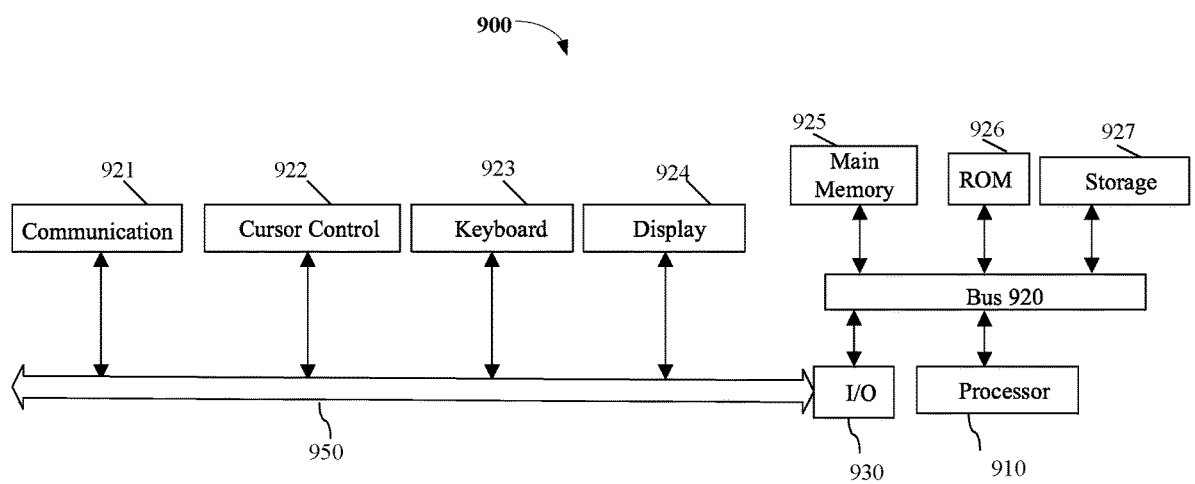
FIG. 4 illustrates a computing device suitable for implementing embodiments of the present disclosure.

FIG. 4 illustrates a computer system 900 on which computing device 105 and/or printer 130 may be implemented. Computer system 900 includes a system bus 920 for communicating information, and a processor 910 coupled to bus 920 for processing information.

Computer system 900 further comprises a random-access memory (RAM) or other dynamic storage device 925 (referred to herein as main memory), coupled to bus 920 for storing information and instructions to be executed by processor 910. Main memory 925 also may be used for storing temporary variables or other intermediate information during execution of instructions by processor 910. Computer system 900 also may include a read only memory (ROM) and or other static storage device 926 coupled to bus 920 for storing static information and instructions used by processor 910.

A data storage device 927 such as a magnetic disk or optical disc and its corresponding drive may also be coupled to computer system 900 for storing information and instructions. Computer system 900 can also be coupled to a second I/O bus 950 via an I/O interface 930. A plurality of I/O devices may be coupled to I/O bus 950, including a display device 924, an input device (e.g., an alphanumeric input device 923 and or a cursor control device 922). The communication device 921 is for accessing other computers (servers or clients). The communication device 921 may comprise a modem, a network interface card, or other well-known interface device, such as those used for coupling to Ethernet, token ring, or other types of networks.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. At least one non-transitory computer readable medium having instructions stored thereon, which when executed by one or more processors, cause the processors to:
   train a prediction model to generate a first processing performance measurements;
   receive print job data;

extract print job metadata from the print job data;
receive a plurality of configuration criteria of a printing system;
receive one or more printing performance requirements for the printing system;
generate the first processing performance measurements of the printing system based on the print job metadata extracted from the print job metadata and each of the plurality of configuration criteria, wherein the first processing performance measurements comprises attributes of the printing system;
determine whether the first processing performance measurements satisfy one or more printing performance requirements for the printing system, including selecting a best fit configuration from the plurality of configuration criteria for the printing system using a weighting algorithm for the printing performance requirements;
determine which of the plurality of configuration criteria for the printing system satisfy the printing performance requirements based on the corresponding first processing performance measurements; and
generate a report including the first processing performance measurements and the best fit configuration.

2. The computer readable medium of claim 1, wherein the prediction model is trained based on training data.

3. The computer readable medium of claim 2, wherein the training data comprises second print job data and processing performance measurements of the printing system for the second print job data.

4. The computer readable medium of claim 3, having instructions stored thereon, which when executed by the one or more processors, further cause the processors to re-train the prediction model based on third print job data and corresponding processing performance measurements received as second training data.

5. The computer readable medium of claim 1, wherein the first processing performance measurements include at least one of, raster image processing time and document interpretation time.

6. A printing system comprising:
a memory to store print performance prediction logic; and
one or more processors to execute the print performance prediction logic to:
train a prediction model to generate a first processing performance measurements;
receive print job data;
extract print job metadata from the print job data;
receive a plurality of configuration criteria of a printing system;
receive one or more printing performance requirements for the printing system;
generate the first processing performance measurements of the printing system based on the print job metadata extracted from the print job metadata and each of the plurality of configuration criteria, wherein the first processing performance measurements comprises attributes of the printing system;
determine whether the first processing performance measurements satisfy one or more printing performance requirements for the printing system, including selecting a best fit configuration from the plurality of configuration criteria for the printing system using a weighting algorithm for the printing performance requirements;
determine which of the plurality of configuration criteria for the printing system satisfy the printing performance requirements based on the corresponding first processing performance measurements; and
generate a report including the first processing performance measurements and the best fit configuration.

7. The printing system of claim 6, wherein the prediction model is trained based on training data.

8. The printing system of claim 7, wherein the training data comprises second print job data and processing performance measurements of the printer for the second print job data.

9. The printing system of claim 6, wherein the prediction model is re-trained based on third print job data and corresponding processing performance measurements received as second training data.

10. The printing system of claim 6, wherein the first processing performance measurements include at least one of, raster image processing time and document interpretation time.

11. The printing system of claim 7, further comprising a printer.

12. The printing system of claim 11, wherein the print performance prediction logic receives the training data from the printer.

* * * * *

UNITED STATES PATENT AND TRADEMARK OFFICE
CERTIFICATE OF CORRECTION

PATENT NO. : 10,901,669 B2
APPLICATION NO. : 15/806594
DATED : January 26, 2021
INVENTOR(S) : Kahwaji et al.

Page 1 of 1

It is certified that error appears in the above-identified patent and that said Letters Patent is hereby corrected as shown below:

In the Claims

Column 7, In Claim 1, Line 8, please delete "metadata" and insert --data--

Column 8, In Claim 6, Line 8, please delete "metadata" and insert --data--

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*